United States Patent
Bates et al.

(10) Patent No.: US 7,343,306 B1
(45) Date of Patent: Mar. 11, 2008

(54) LOCATION-BASED VEHICLE RISK ASSESSMENT SYSTEM

(75) Inventors: Cary Lee Bates, Rochester, MN (US); Steven Paul Jones, Rochester, MN (US); Eric John Nelson, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 744 days.

(21) Appl. No.: 09/553,010

(22) Filed: Apr. 20, 2000

(51) Int. Cl.
*G06Q 40/00* (2006.01)
(52) U.S. Cl. .............................. 705/4; 701/35
(58) Field of Classification Search ............ 705/4, 705/40; 701/36, 33, 35
See application file for complete search history.

(56) References Cited

U.S. PATENT DOCUMENTS

| | | | | |
|---|---|---|---|---|
| 5,289,369 A | * | 2/1994 | Hirshberg | 235/382.5 |
| 5,797,134 A | | 8/1998 | McMillan et al. | |
| 6,006,148 A | * | 12/1999 | Strong | 701/33 |
| 6,064,970 A | * | 5/2000 | McMillan et al. | 340/439 |
| 6,263,438 B1 | * | 7/2001 | Walker et al. | 380/243 |
| 6,393,346 B1 | * | 5/2002 | Keith et al. | 340/438 |
| 6,430,488 B1 | * | 8/2002 | Goldman et al. | 307/10.1 |

FOREIGN PATENT DOCUMENTS

| | | |
|---|---|---|
| EP | 0 691 013 B1 | 3/1994 |
| WO | WO94/22112 A1 | 3/1994 |
| WO | WO99/21112 A1 | 10/1997 |
| WO | WO 03/073339 A1 * | 9/2003 |

OTHER PUBLICATIONS

E. A. Bretz, "X Marks the Spot, Maybe," IEEE Spectrum, Apr. 2000, pp. 26-36.

* cited by examiner

*Primary Examiner*—Joseph Thomas
*Assistant Examiner*—Vanel Frenel
(74) *Attorney, Agent, or Firm*—Wood, Herron & Evans

(57) ABSTRACT

An apparatus, program product and method track the location of a vehicle during at least a portion of a period of the time associated with an economic transaction so that risks associated with the actual usage of the vehicle can be accommodated in the costs for the transaction. In particular, a determination is made during a time period associated with an economic transaction as to whether the vehicle is located at a location having an increased level of risk. Costs for the economic transaction are then adjusted based at least in part on the presence of the vehicle in a location with an increased level of risk. In one exemplary environment, car rental rates are adjusted based upon the actual usage of a rented vehicle. In another exemplary environment, insurance premiums are adjusted based upon the actual usage of an insured vehicle. In either event, usage that results in a vehicle being located in areas of comparatively higher risk can be accounted for in additional transactional costs, resulting in improved allocation of risk and minimization of economic inefficiencies.

4 Claims, 4 Drawing Sheets

LOCATION-BASED VEHICLE RISK ASSESSMENT SYSTEM

FIELD OF THE INVENTION

The invention is generally related to assessing and establishing rates for economic transactions associated with usage of vehicles, e.g., in setting automobile insurance premiums and rental rates.

BACKGROUND OF THE INVENTION

Operation of vehicles such as automobiles, trucks, boats, airplanes, and the like is subject to a variety of risks. For example, for automobiles, usage of a vehicle often entails risks such as accidents, wear and tear due to poor road conditions, and threats to person and property due to crimes such as car theft, car-jacking, vandalism and assault. While not as prevalent as the above risks, usage of some vehicles may also entail risk to person or property due to terrorist activities or combat activities, e.g., in geographic regions experiencing military or political conflict.

The owners and operators of vehicles assume much of the risk associated with the usage of their vehicles. As such, an owner or operator may minimize risks through careful operation and good judgment, e.g., by avoiding driving through high crime areas at night in the interest of personal safety. However, in addition to the personal risks to an owner or operator, the usage of a vehicle by an owner or operator may also affect other parties having an economic interest in the vehicle or operation thereof. Often, such secondary parties have little or no control on how an operator uses the vehicle, and as such, such parties can be significantly impacted by an operator's use of a vehicle.

For example, insurance companies that insure vehicles or operators charge policy holders premiums that are typically determined using complex actuarial formulas. The actuarial formulas often attempt to approximate the level of risk posed by different policy holders, so that premiums can be assessed based upon the perceived levels of risk, and so sufficient revenue can be generated to pay all claims of policy holders while ensuring a reasonable profit for the companies. Policy holders that have filed previous claims, have caused accidents, or have been cited for speeding violations or more serious crimes such as drunk driving are often charged higher premiums based upon a perceived increase risk level.

In addition, location-based factors such as a policy holder's distance to work and the vehicle theft rates in a policy holder's community may also be factored into the premiums charged to such policy holders. It is assumed, for example, that a person living in an urban area having a high rate of vehicle theft is more likely to have their vehicle stolen than another policy holder in a rural area where the incidence of vehicle theft is much lower.

While such historical data is helpful in setting reasonable premiums, such data doesn't always accurately predict the activities of individual policy holders, and thus the risks posed by each of those policy holders. Insurance companies typically have little control over or feedback from how and where a policy holder operates a vehicle. While a policy holder may live in a relatively safe area, the policy holder may travel into riskier areas without the knowledge of the insurance company. A policy holder may also travel frequently in high accident areas, and thus pose a greater risk of encountering an accident, yet an insurance company often has no way of identifying or accounting for the additional risk posed by that policy holder.

Car rental companies also have a similar problem with controlling the usage of rented vehicles. Rental rates are typically set based upon factors such as the expected depreciation of vehicles and expected wear and tear, as well as estimated rates of vandalism, accidents, theft, and other factors that can affect costs and the number of times that a vehicle can be rented. Likewise with insurance companies, however, the actual usage of a vehicle is typically not a significant factor in the determination of appropriate rental rates. Although some vehicle rentals are charged out based upon mileage; however, where or how the operator drives the vehicle is still not accounted for in the ultimate rate paid by the operator.

Common to both insurance companies and rental companies, as well as other entities that enter into economic transactions associated with vehicle usage, is the fact that values or costs associated with such transactions are typically assessed principally on the basis of historical data. Actual usage by the operators of the vehicles that enter into such economic transactions are typically not relied upon. By failing to take into account actual usage of a vehicle subject to an economic transaction, however, economic inefficiencies are introduced, which can result in non-optimal costs allocated for different situations. From an economic standpoint, operators of vehicles that present lower actual risks are required to bear some of the costs that would be more appropriately borne by other, riskier operators. As such, a significant need exists in the art for a better manner of calculating costs associated with vehicle usage economic transactions to more appropriately allocate such costs among different vehicle operators.

SUMMARY OF THE INVENTION

The invention addresses these and other problems associated with the prior art by providing an apparatus, program product, and method in which the location of a vehicle during at least a portion of a period of the time associated with an economic transaction is tracked so that risks associated with the actual usage of a vehicle can be accommodated in the costs for the transaction. In particular, a determination is made during a time period associated with an economic transaction as to whether the vehicle is located at a location having an increased level of risk. Costs for the economic transaction are then adjusted based at least in part on the presence of the vehicle in a location with an increased level of risk.

By accounting for actual usage information, the costs associated with risks assumed by specific vehicle operators can be better allocated among different operators. Doing so provides an economic incentive both to the operators and to the entities that enter into economic transactions with such operators, thereby decreasing economic inefficiencies associated with the economic transactions.

While a wide variety of alternate environments and applications may find benefit from the principles discussed herein, vehicle rental and insurance transactions represent two specific applications that may find particular benefit. For example, where an economic transaction is the rental of a vehicle, a rental company may be capable of charging lower rates for customers who do not expose the vehicles to risks to which other customers may expose the vehicles. Customers thus have an economic incentive to reduce the risks associated with their usage of the vehicle and thereby decrease their cost. Moreover, the incidence of wear and tear, accidents, crimes, etc. associated with the rented vehicles may be reduced, thereby lowering operating costs for the rental company, and possibly permitting the company to charge lower rates to its customers.

Likewise, with respect to insurance, policy holders may have an economic incentive to minimize the risk to which their vehicles are exposed. The costs associated with such risks are also allocated more appropriately among different policy holders. Moreover, as policy holders attempt to minimize risks, a decrease in claims may result, thereby reducing cost to the insurance company, and possibly permitting the insurance company to charge lower premiums.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The illustrated embodiments generally operate by tracking the location of a vehicle for the purpose of conducting an economic transaction associated with the usage of the vehicle over a period of time. The economic transaction may be based upon any number of different activities associated with usage of a vehicle, including rental of a vehicle, insurance of a vehicle, etc. A vehicle may include practically any mobile form of transport including, for example, automobiles, trucks, airplanes, boats, bicycles, trailers, motorcycles, motor homes, etc. Moreover, systems consistent with the invention may also have additional utility in parental monitoring of minor operators.

Further, in the illustrated embodiments, the location of a vehicle is utilized to determine a particular region within which the vehicle is located. Varying levels of risk are associated with different regions such that location of a vehicle within a region of comparatively higher risk can be detected. The types of risk that a particular vehicle may be subjected to will vary depending upon the type of vehicle. For an automobile, for example, risks may include risk of vehicle theft, risk of injury, risk of crime, risk of vehicle accident, risk of hazardous road conditions, risk of terrorist activity, risk of combat activity, and combinations of the same. For other vehicles, however, the particular types of risk to which such vehicles are subjected may vary. For example, for airplanes a risk of mechanical failure may be of comparatively greater concern. It will be appreciated that any combination of such risks may be accommodated for in determining the costs of economic transactions in the manner discussed herein.

Figure 1:
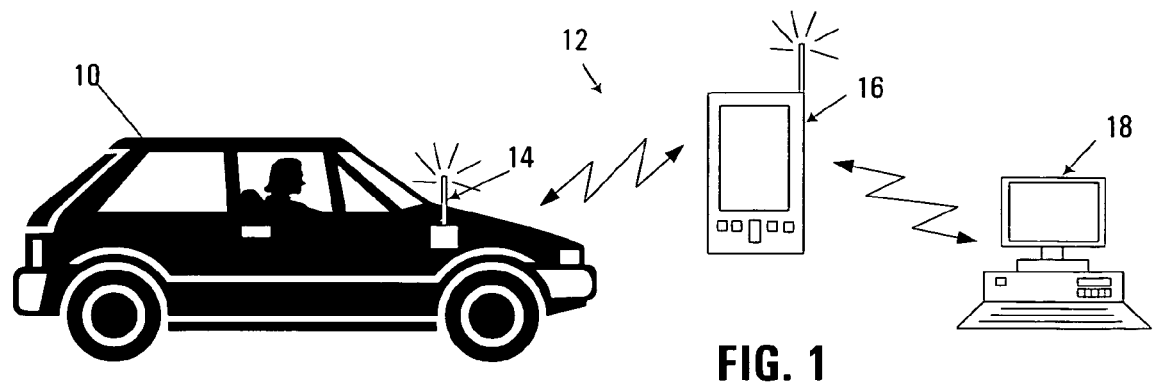
FIG. 1 is a schematic representation of a location-based vehicle risk assessment system consistent with the invention.

Turning now to the Drawings, wherein like numbers denote like parts throughout the several views, FIG. 1 illustrates a specific implementation of the invention in a car rental application. Illustrated in the figure is a rental automobile 10 that interfaces with a location-based vehicle assessment system 12 consistent with the invention. In the illustrated implementation, risk assessment system 12 includes a vehicle-mounted vehicle location tracking system 14, a handheld computer 16 and a billing computer 18. In a car rental environment, for example, a vehicle location tracking system 14 is mounted within each of a plurality of rental automobiles owned by a car rental agency. One or more handheld computers 16 are used in the field in connection with checking out and checking in vehicles as they are rented and returned. Location identification data is temporarily stored in such handheld computers until such time as the data can be transmitted to a billing computer system for determination of the appropriate cost of the economic transaction.

Figure 2:
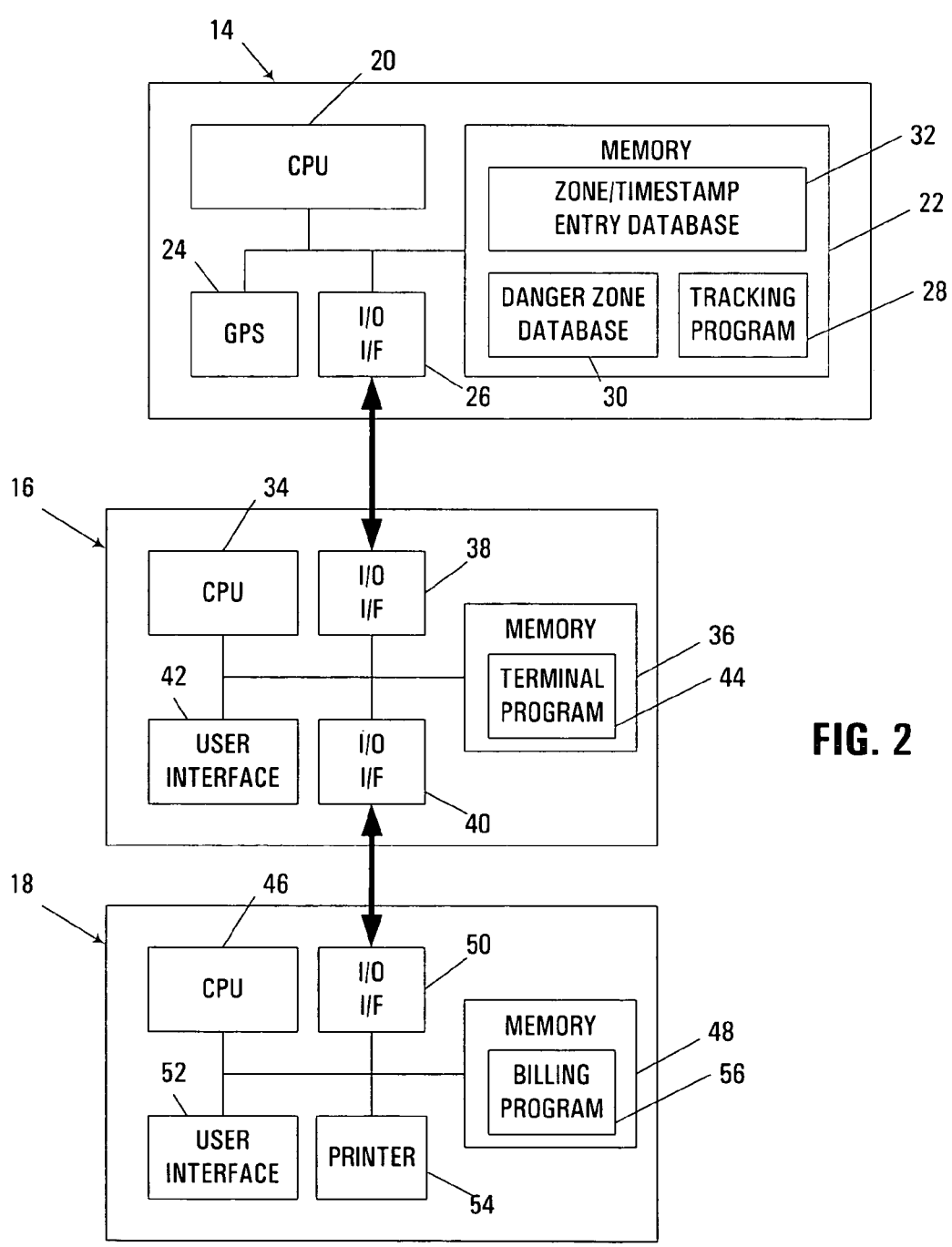
FIG. 2 is a block diagram of the primary components in the location-based vehicle risk assessment system of FIG. 1.

As shown in FIG. 2, for example, vehicle location tracking system 14 includes a central processing unit 20 interfaced with a memory 22, a location sensor 24 and an input/output (I/O) interface 26. Location sensor 24 may be implemented, for example, using a global positioning system (GPS) receiver utilized to receive satellite transmissions and calculate a location therefrom, the operation of which is well known in the art. Other location technologies may also be used in the alternative.

Interface 26 is implemented using appropriate electronics for communicating with handheld computer 16 via a agreed-upon protocol. In the illustrated implementation, a wireless communication capability is supported, e.g., using wireless Ethernet, Bluetooth, Cellular, Infrared or other known wireless transmission technologies. In the alternative, a wired interface may be provided between handheld computer 16 and system 14.

Central processing unit 20 typically executes a control program, herein referred to as a tracking program 28, which is resident in the memory and executed by the central processing unit. The tracking program primarily tracks the current location of the vehicle, and performs additional communications functions to interface with the handheld computer. The tracking program utilizes various data structures in its operation, including a danger zone database 30 and a zone/timestamp entry database 32, among others.

Danger zone database 30 identifies zones, or regions (which will hereinafter be used interchangeably), and assigns relative levels of risks to each of such regions. The regions may be defined in any number of manners, including, for example, the combination of a point in space and a radius, a range of longitudinal and latitudinal coordinates, a series of points that define more complex boundaries, etc. In addition, any number of levels of risk may be assigned to particular regions. For example, only two levels of risk, i.e., "dangerous" or "not dangerous" may be assigned to any given region, or in the alternative, additional intermediate levels of risk may be supported to accommodate different types of activities. Also, as discussed below risk levels may not be stored in database 30 in certain applications.

Zone/timestamp entry database 32 stores a plurality of timestamped entries that identify both the location and a time at which the vehicle was located at such a location. To minimize the size of database 32 in the illustrated implementation, entries are associated with regions or zones, rather than with specific locations. Moreover, entries are added to the database only when the current zone in which a vehicle is located changes. As such, if the vehicle is maintained in a given region for an extended period of time, only one entry will be generated, with the length of time the vehicle stays in a region determined by calculating the difference between the entry timestamp and that in the next entry in the database (generated when the vehicle enters another region). In the alternative, more detailed location and timestamp information may be stored in other embodiments.

Handheld computer 16 likewise includes a central processing unit 34, memory 36 and complementary input/output interface 38 for interfacing with interface 26 of tracking system 14. In addition, handheld computer 16 includes an additional input/output interface 40 for use in interfacing with billing computer 18. In some implementations, a single interface may used to interface the handheld computer with both the billing computer and the tracking system. As such, two separate interfaces 38, 40 may not be required. Moreover, in the illustrated implementation, it may be desirable to provide any of the aforementioned wireless interconnections between handheld computer 16 and billing computer 18 and thereby facilitate the fast and efficient download of data from the handheld computer to the billing computer. However, in other implementations, a wired communication path may be provided.

Handheld computer 16 also includes a user interface 42 for interacting with a user. As such, user interface 42 typically includes some display mechanism such as in an LCD panel or other display, as well as an input mechanism such as a keyboard, touchpad, pointing device, etc. Both display and input may also be provided via a touch-sensitive display.

To implement the functionality of the handheld computer, a terminal program 44 is resident in memory 36 and executed by central processing unit 34. As will be discussed in greater detail below, the terminal program serves to interface with both the tracking system and the billing computer to assist in the transfer of downloaded location information from the tracking system to the billing computer, as well as to update the tracking system with current risk and/or zone information.

Billing computer 18 is illustrated as including a central processing unit 46, a memory 48, and an input/output interface 50 capable of cooperating with interface 40 on handheld computer 16 to transmit data between the two components. In addition, billing computer 18 includes a user interface 52 for interacting with the user (e.g., a monitor, keyboard and mouse), as well as a printer 54 for outputting billing reports for use in charging customers based upon actual usage of their vehicles. Billing computer 18 is executed under the control of a billing program 56, resident in memory 48 and executed by central processing unit 46. Billing program 56 generally handles information exchange with handheld computer 16, and performs various billing operations including tracking of rental records, outputting of billing reports, payment processing and other functions that are well known in the art.

Each of tracking system 14, handheld computer 16 and billing computer 18 may be implemented using practically any type of computer, computer system or other programmable electronic device. The central processing unit of each component 14-18 may include one or more processors (e.g., microprocessors or microcontrollers), and the memory within each component may represent volatile or non-volatile solid state memories, magnetic storage media, optical storage media, or combinations of the same, as well as any supplemental levels of memory, e.g., cache memories, backup memories (e.g., programmable or flash memories), read-only memories, etc. In addition, each memory may be considered to include memory storage physically located elsewhere in a component, e.g., any cache memory in a processor, as well as any storage capacity used as a virtual memory, e.g., as stored on a mass storage device or on another component coupled to such a component via a network interconnection. Each component may also include additional components, e.g., mass storage devices, network interfaces, etc., as is well known in the art.

Each component 14-18 typically operates under the control of an operating system, and executes various computer software applications, components, programs, objects, modules, etc. (e.g., programs 28, 44 and 56 and databases 30, 32, among others). Moreover, various applications, components, programs, objects, modules, etc. may also execute on one or more processors in another computer or other device coupled to such components via networked interconnections, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs". The computer programs typically comprise instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links.

It will be appreciated that a wide variety of alternate hardware implementations may be used consistent with the invention. For example, a handheld computer 16 may not be required in some implementations. Moreover, determination of the location of vehicles may be performed by a central system in connection with individual vehicle-mounted components. For example, vehicles may include transmitters for transmitting identifying signals, with a central system utilized to detect the locations of the origins of such transmissions. Other vehicle tracking technologies may also be used in the alternative.

Furthermore, storage of levels of risk and/or region definitions may be omitted from tracking system 14, with the functionality utilized in determining the level of risk and/or the particular region that a vehicle is located allocated to one or both of handheld computer 16 and billing computer 18. In such an implementation, tracking system 14 would merely provide location information, and optionally, timing information to the handheld computer or billing computer, with the determination of the level of risk and the particular region made in the handheld or billing computer. A wide variety of other hardware implementations may be utilized consistent with the invention. Therefore, the invention is not limited to the particular implementation disclosed herein.

Figure 3:
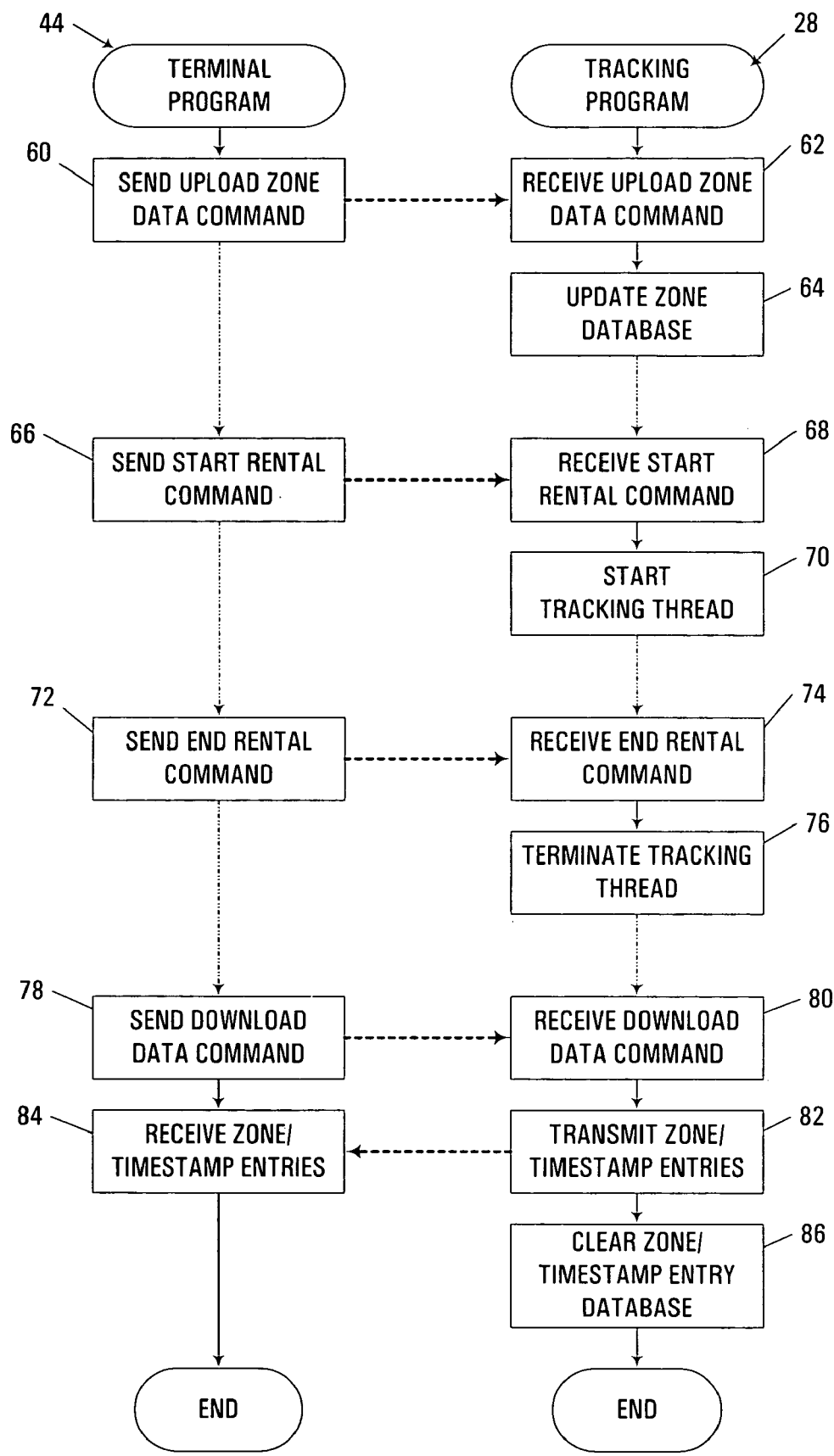
FIG. 3 is a flowchart illustrating the interaction between the terminal program and tracking program of FIG. 2.

FIG. 3 illustrates the interaction between terminal program 44 and tracking program 28 to perform an exemplary rental transaction. Typically, sometime prior to rental of the vehicle, the terminal program initiates the upload of zone data into the tracking program for storage of the region definitions and/or the levels of risk assigned to different regions within which the vehicle may travel. Initiation of such an operation is provided by sending an upload zone data command as shown in block 60, e.g., as initiated by a user interacting with the handheld computer. The upload zone data command is received in block 62 by the tracking program, and as a result, the zone database is updated as illustrated in block 64.

In some embodiments, levels of risk and region definitions may be static and not programmable into the tracking system. As such, support for an upload command may not be provided in some implementations. However, given that the levels of risks for different regions may vary over time, and the fact that different vehicles may be located in different geographic regions, it may be desirable to provide such a programmable feature so that individual tracking units can be customized for different situations. Put another way, if a vehicle is only used in California, it may be desirable to minimize the size of the zone database to provide only regions in the state of California, or in the area surrounding a particular city in the state within which the vehicle is based.

Sometime after uploading the data, when a vehicle is ready to be rented to a customer, typically an employee of the car rental agency activates the handheld computer prior to checkout by the customer by sending a start rental command to the tracking system as shown in block 66. At this time, other rental data, e.g., the vehicle ID, the customer name and/or number, the time of day, etc., may also be stored in the handheld computer by the rental employee. The tracking program receives the start rental command as shown at block 68, and in response thereto, starts a tracking thread within the tracking program. As will be discussed below with reference to FIG. 4, the tracking thread monitors the location of the vehicle continuously until such time as it is terminated, and records the tracked location of the vehicle at different intervals. Various manners of starting and terminating a thread may be utilized consistent with the invention. For example, a rental mode flag may be set or reset based upon whether the vehicle is currently being rented. In other implementations, the thread may be destroyed or invoked as appropriate, and in a manner well known in the art.

Next, as represented at block 72, sometime after the rental of the vehicle has been initiated, a customer returns the vehicle, and a vehicle check-in procedure is performed by the car rental agency upon the vehicle's return. As a component of this procedure, an employee activates the handheld computer to send an end rental command from the terminal program to the tracking program as illustrated in block 72. The command is received by the tracking program in block 74, and as a result, the tracking thread is terminated as illustrated in block 76. Additional check-in procedures, e.g., checking the condition of the vehicle, recording the mileage and the fuel consumption, etc., may also be performed at this time by a rental company employee.

Once the vehicle has taken out of rental mode, and typically as another component of the check-in procedure, the rental employee may initiate download of the tracked location information by controlling the handheld computer to send a download data command as shown in block 78. The download data command is received by the tracking program as illustrated at block 80, and in response thereto, the zone/timestamp entries stored in the tracking system are transmitted to the handheld computer in block 82. The handheld computer terminal program then receives the entries as illustrated in block 84 and temporarily stores the entries in its memory, typically in association with an identifier that identifies the rental vehicle so that tracking information for multiple vehicles may be maintained in a handheld computer at any given time. In addition, as illustrated in block 86, once the zone/timestamp entries are transmitted, the entry database is cleared. Upon completion of block 86, the interaction between the tracking program and terminal program is complete for this particular rental transaction.

In the alternative, the entry database may be cleared upon the initiation of a rental operation. In other embodiments, a separate command may need to be sent by the terminal program whenever it is desirable to clear the database. Moreover, in other implementations, the download data and end rental commands may be combined such that, upon return of a vehicle, the tracking thread is terminated and the data downloaded to the handheld computer as a component of a single operation. Other modifications will be apparent to one of ordinary skill in the art having the benefit of the instant disclosure.

Figure 4:
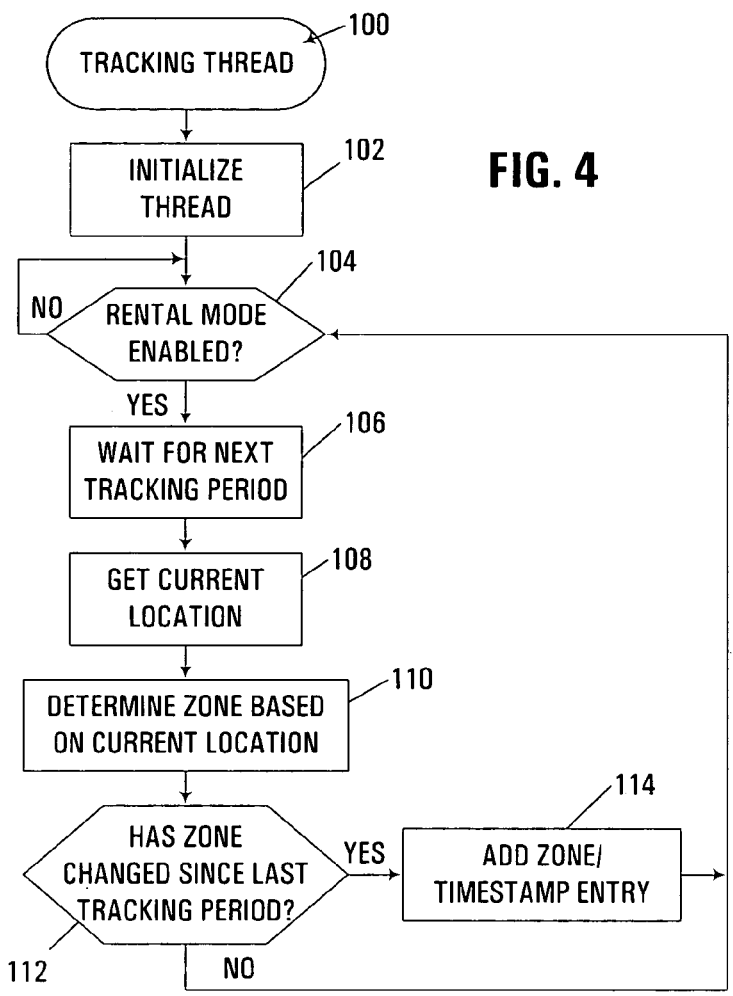
FIG. 4 is a flowchart illustrating the program flow of the tracking thread referenced in FIG. 3.

FIG. 4 illustrates the tracking thread 100 referenced in FIG. 3. As discussed above, the tracking thread runs continuously during rental of a vehicle to monitor the location of the vehicle, at least during a portion of the time that the vehicle is being rented. Thread 100 begins in block 102 by performing routine thread initialization operations. Then, a loop is initiated in block 104 to determine whether the rental mode is enabled. Block 104 assumes that the manner of starting and terminating the tracking thread in FIG. 3 is to set or clear a rental mode flag based upon whether the vehicle is currently being rented. If the vehicle is not being rented, block 104 loops back to itself to periodically check the rental mode flag until the flag is enabled, typically with a delay involved to minimize the processing overhead of the thread.

If rental mode is enabled, however, control passes to block 106 to wait for a next tracking period. Specifically, it is typically desirable to determine the location of a vehicle on a relatively infrequent basis, e.g., every minute or so.

Next, once a next tracking period has been reached, control passes to block 108 to obtain the current location from the GPS receiver, the specifics of which are known in the art. Block 110 then determines the current zone or region corresponding to the current location. Block 112 next determines whether the zone has changed since the last tracking period. If not, control returns to block 104 with no update made to the zone/timestamp database. If, however, the zone has changed, control passes to block 114 to add a new entry to the database, including both a timestamp and the current zone within which the vehicle is located. In addition, in the illustrated implementation, the zone/timestamp entry indicates a level of risk associated with the zone (and identified in the danger zone database). In other embodiments, however, no determination of the level of risk associated with the zone may be performed by the tracking thread, with such functionality implemented instead in either of the handheld computer or the billing computer.

Determination of the zone based upon the current location will vary depending upon the particular definition utilized to define zones. If zones are defined by single points in space, determination of a particular zone or region may be made by locating the region with the closest point to the current location of the vehicle. In the alternative, if boundaries are defined for particular regions, determination of which zone or region the vehicle is in is based upon determining which boundary the location is within.

Figure 5:
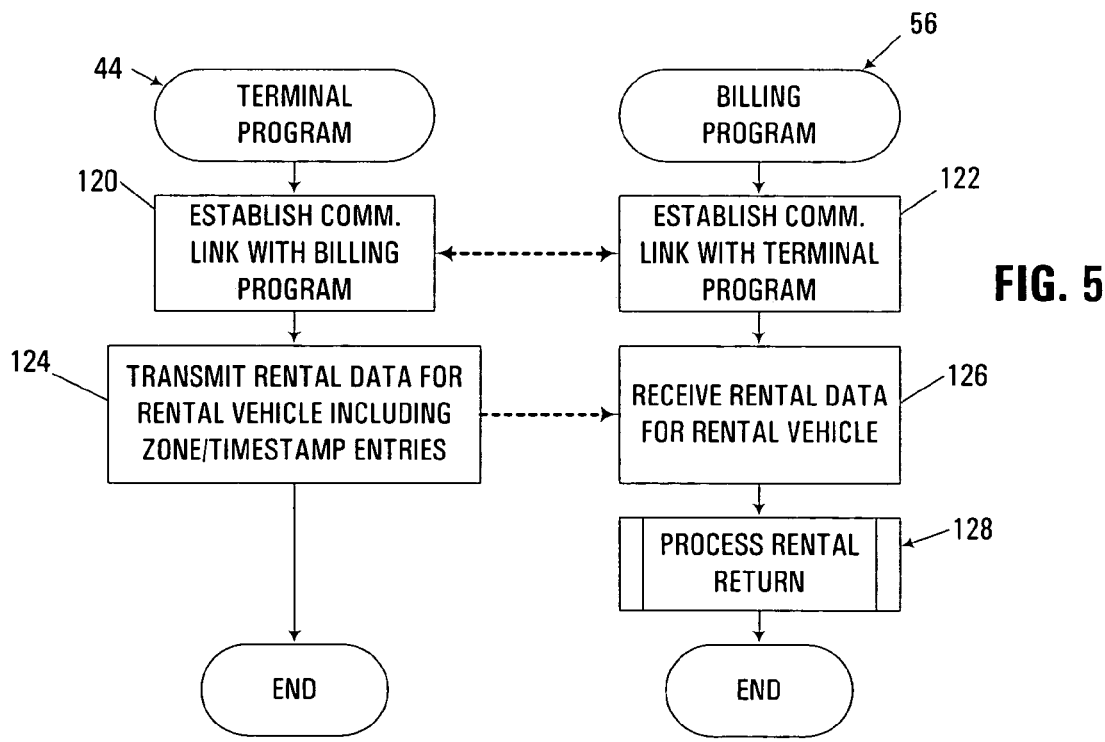
FIG. 5 is a flowchart illustrating the interaction between the terminal program and billing program of FIG. 2.

FIG. 5 next illustrates the interaction of terminal program 44 and billing program 56 in downloading the data obtained from the rented vehicle for the purpose assessing a cost for the rental. In particular, blocks 120 and 122 illustrate that a communication link is established between the terminal program and the billing program, initiated in either component and performed using an agreed-upon handshaking protocol as is well known the art. Once the link is established, download of the rental data for the rental vehicle is initiated by either of the handheld computer or the billing computer, e.g., through the user interfaces thereof, or via an automatic synchronization mechanism. The rental data includes the zone/timestamp entries downloaded from the vehicle tracking system, and may include additional information such as mileage, fuel consumption, and customer information necessary for identifying the customer record in the billing system that is associated with the rental vehicle. The transmission of the rental data is illustrated in block 124, with the reception thereof illustrated in block 126. Upon reception of the rental data, a process rental routine 128 is called in the billing program to process the return of the vehicle rental in the billing system.

Figure 6:
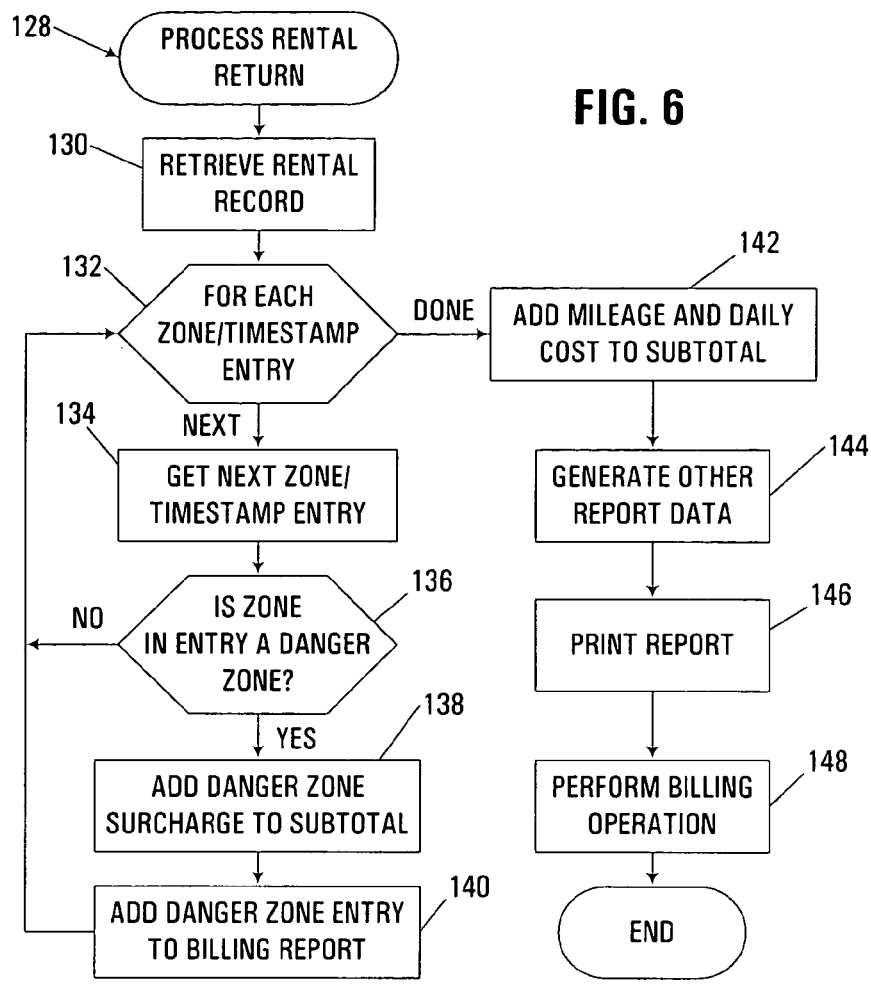
FIG. 6 is a flowchart illustrating the program flow of the process rental return routine referenced in FIG. 5.

FIG. 6 illustrates process rental return routine 128 in greater detail. Routine 128 begins in block 130 by retrieving the rental record associated with the rental data received from the handheld computer. Next, block 132 initiates a loop to process each zone/timestamp entry associated with the vehicle rental. For each such entry, control passes to block 134 to retrieve the entry, and then to block 136 to determine whether the entry is a "danger zone", i.e., a region associated with an increased level of risk. As discussed above, determination of whether a zone is a "danger zone" may be made either by accessing a risk value stored in the entry or by accessing a database local to the billing system to determine the level of risk associated with a region, or location therein, identified in the entry.

If the zone is not found to be a "danger zone", block 136 passes control directly to block 132 to process the next entry. However, if the zone is identified as having an increased level of risk, control passes to block 138 to add a "danger zone" surcharge to the subtotal for the rental cost. Next, block 140 adds a "danger zone" entry to a billing report for display on a receipt presented to the customer. Control then returns to block 132 to process additional entries.

Once each entry has been processed, control passes to block 142 to add any additional costs to the subtotal calculated above. For example, mileage in excess of an allocated amount may be charged at a predetermined rate. In addition, a base rate, based upon the number of hours or days that a customer rents the vehicle is typically also added at this time, as well as any additional charges such as insurance costs, sales tax, etc.

Next, block 144 generates other report data, e.g., providing the customer information, as well as the other cost entries associated with mileage, daily rate, insurance costs, taxes, and other information commonly present on a rental invoice.

Next, block 146 prints the report for the customer, and block 148 performs a billing operation, e.g., by charging a credit card or receiving a check or cash from the customer to complete the rental transaction. Once the billing operation is performed, the rental is complete, and routine 128 is terminated.

Adjustments to the cost of a vehicle rental based upon vehicle location may be performed in a number of manners. For example, the surcharge may be a fixed amount based upon the presence of the vehicle in a region of high risk at any time during the rental period. In the alternative, the surcharge may be based upon the length of time that the vehicle was located in a region of increased risk. The surcharge may also be scaled based upon the perceived level of risk for different areas, e.g., so that a vehicle that was within a high risk area is allocated a surcharge that is greater than a vehicle located at a medium risk area. In addition, rather than a surcharge, one of a plurality of base rates may be selected based upon the presence or absence of a zone of increased risk. Other manners of modifying the cost of an economic transaction such as a rental transaction based upon detection of the location of a vehicle being within a region of increased risk will be apparent to one of ordinary skill in the art having the benefit of the instant disclosure.

Figure 7:
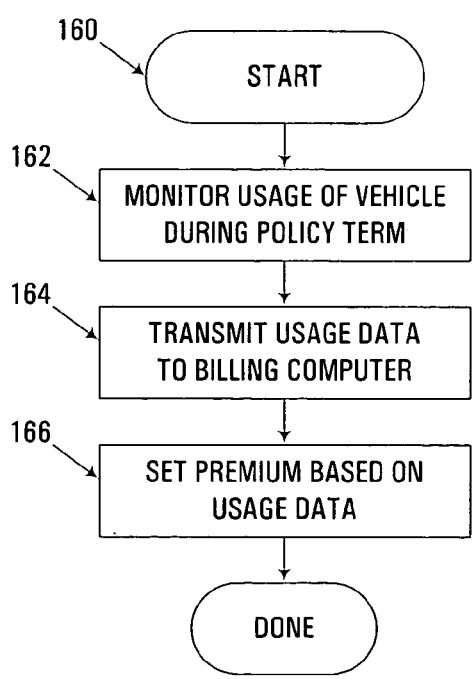
FIG. 7 is a flowchart illustrating an exemplary sequence of operations utilized in setting an insurance premium associated with usage of an vehicle consistent with the invention.

As discussed above, other economic transactions may utilize location-based risk assessment consistent with the invention. As shown in FIG. 7, for example, a sequence of operations performed to set a premium for a vehicle insurance policy is illustrated at 160. Generally, during a policy term, the usage of a vehicle during a policy term may be monitored as illustrated at block 162, with the usage data tracked during such monitoring period transmitted to a billing computer as illustrated in block 164. Based upon such usage data, a premium either for the past (current) policy term, or for a subsequent policy term, may be set in block 166 based upon whether or how often a vehicle was located in a region of increased risk. Any of the alternatives as discussed above in terms of pricing, surcharges, definition of regions, etc. in association with rental transactions may also apply to insurance transactions consistent with the invention.

Various modifications may be made to the illustrated embodiments without departing from the spirit and scope of the invention. For example, additional manners of tracking location and compiling location information may be used. For example, vehicles may be provided with vehicle location tracking systems that are interfaced with cellular telephones to permit a central system to periodically connect with such tracking systems to download relevant location information from vehicles.

In addition, perceptible notification to a user and/or to a contracting party may be provided in response to location of a vehicle within a particular danger zone. An audible and/or visual alarm could sound within a vehicle when a region of relatively high risk is encountered. A car rental company (in a rental scenario) or an insurance company (in an insurance scenario) could also be immediately notified via a wireless transmission. In addition, it may be desirable to automatically disable a vehicle when the vehicle remains within a high risk area. As an example, an operation could be notified upon entering a particularly high risk area that they should leave immediately or the vehicle will be automatically disabled.

It will also be appreciated that any amount of human intervention within the process of tracking, accumulating, downloading and processing location information to adjust the cost of an economic transaction may be provided, with automated control utilized to supply the remaining functionality.

Other modifications will be apparent to one of ordinary skill in the art. Therefore, the invention lies in the claims hereinafter appended.

What is claimed is:

1. A method of conducting an economic transaction associated with rental of a vehicle over a period of time, the method comprising:
   (a) tracking the location of the vehicle during at least a portion of the period of time associated with the rental, including detecting that the vehicle is located at a location having an increased level of risk; and
   (b) adjusting a cost associated with the economic transaction associated with the rental at least in part based on the location of the vehicle at the location having the increased level of risk;
wherein tracking the location of the vehicle includes calculating the location of the vehicle at a point in time using a location sensor coupled to the vehicle and storing a timestamped entry in a database identifying the point in time and the calculated location of the vehicle at such point in time, wherein tracking the location of the vehicle further includes determining a current region for the vehicle from the calculated location, wherein calculating the location of the vehicle includes calculating a second location for the vehicle at a second point in time, and wherein storing the timestamped entry in the database includes storing a second timestamped entry in the database for the second calculated location only if the region associated with the second calculated location differs from the region associated with the first calculated location.

2. The method of claim 1, wherein the current region is selected from a plurality of regions, the method further comprising assigning a level of risk to each of the plurality of regions.

3. An apparatus, comprising:
   (a) a vehicle location tracking system configured to track the location of a vehicle during at least a portion of a period of time associated with an economic transaction associated with rental of the vehicle; and
   (b) a program configured to receive location information from the vehicle location tracking system to identify the location of the vehicle during the portion of the period of time associated with the economic transaction associated with rental of the vehicle, at least a portion of the location information indicating that the vehicle was located at a location having an increased level of risk, the program further configured to adjust a cost associated with the economic transaction associated with rental of the vehicle at least in part based on the location of the vehicle at the location having the increased level of risk;
wherein the vehicle location tracking system comprises a location sensor coupled to the vehicle, and wherein the vehicle location tracking system further includes a second program configured to store the location information in the form of timestamped entries, each identifying one of a plurality of regions and a time at which the vehicle was located in such region, the second program further configured to add a timestamped entry at a second point in time only when a current region for the vehicle at the second point in time differs from a previous region for the vehicle at a first, previous point in time.

4. The apparatus of claim 3, wherein each of the plurality of regions is associated with a level of risk.

* * * * *